United States Patent
Turtinen et al.

(10) Patent No.: US 12,457,645 B2
(45) Date of Patent: Oct. 28, 2025

(54) SKIPPING MONITORING OF DOWNLINK CONTROL CHANNEL DURING RANDOM ACCESS PROCEDURE

(71) Applicant: Nokia Technologies Oy, Espoo (FI)

(72) Inventors: Samuli Turtinen, Ii (FI); Chunli Wu, Beijing (CN); Jussi-Pekka Koskinen, Oulu (FI); Daniela Laselva, Klarup (DK)

(73) Assignee: Nokia Technologies Oy, Espoo (FI)

( * ) Notice: Subject to any disclaimer, the term of this patent is extended or adjusted under 35 U.S.C. 154(b) by 712 days.

(21) Appl. No.: 17/607,939

(22) PCT Filed: May 2, 2019

(86) PCT No.: PCT/CN2019/085419
§ 371 (c)(1),
(2) Date: Nov. 1, 2021

(87) PCT Pub. No.: WO2020/220378
PCT Pub. Date: Nov. 5, 2020

(65) Prior Publication Data
US 2022/0295563 A1    Sep. 15, 2022

(51) Int. Cl.
*H04W 74/0833*    (2024.01)
*H04W 52/02*    (2009.01)
(Continued)

(52) U.S. Cl.
CPC ... *H04W 74/0833* (2013.01); *H04W 52/0216* (2013.01); *H04W 72/23* (2023.01); *H04W 74/006* (2013.01); *H04W 74/0838* (2024.01)

(58) Field of Classification Search
CPC ......... H04W 74/0833; H04W 52/0216; H04W 72/23; H04W 74/006; H04W 74/0838;
(Continued)

(56) References Cited

U.S. PATENT DOCUMENTS

2011/0014922 A1* 1/2011 Jen ................... H04W 74/0833
                                                            455/450
2011/0116364 A1* 5/2011 Zhang ................. H04W 74/08
                                                            370/216
(Continued)

FOREIGN PATENT DOCUMENTS

CN       109699087 A       4/2019
KR    20190019837 A       2/2019

OTHER PUBLICATIONS

"$3^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.2.0, May 2008, 33 pages.
(Continued)

*Primary Examiner* — Ivan O Latorre
(74) *Attorney, Agent, or Firm* — McCarter & English LLP

(57) ABSTRACT

Embodiments of the present disclosure relate to for skipping monitoring of downlink control channel in random access. A first device receives from a second device a command indicating the first device to skip monitoring a downlink control channel between the second device and the first device for a time period. In response to the random access procedure being triggered by a first trigger condition, the first device determines whether the time period overlaps with a time window associated with a random access procedure. The first device ignores or performs the command based on the determination.

20 Claims, 9 Drawing Sheets

(51) Int. Cl.
*H04W 72/23* (2023.01)
*H04W 74/00* (2009.01)
*H04W 74/0838* (2024.01)

(58) Field of Classification Search
CPC ... H04W 74/008; H04W 74/002; Y02D 30/70
See application file for complete search history.

(56) References Cited

U.S. PATENT DOCUMENTS

| | | | | |
|---|---|---|---|---|
| 2020/0037396 | A1* | 1/2020 | Islam | H04W 52/0229 |
| 2020/0100179 | A1* | 3/2020 | Zhou | H04W 52/0209 |
| 2020/0100311 | A1* | 3/2020 | Cirik | H04W 76/19 |
| 2021/0185614 | A1* | 6/2021 | Zhou | H04L 5/0051 |
| 2022/0191793 | A1* | 6/2022 | Murray | H04W 72/23 |
| 2022/0209920 | A1* | 6/2022 | Wu | H04W 72/21 |

OTHER PUBLICATIONS

"Early stop of Random Access Response Monitoring", Sunplus mMobile Inc., 3GPP TSG-RAN WG2 Meeting #61bis, R2-081882, Apr. 2008, 4 pages.
"Align the DRX Active Time with RA procedure", Sunplus mMobile Inc., 3GPP TSG-RAN WG2 Meeting #62bis, R2-083428, Jul. 2008, 7 pages.
3GPP TR 38.840 V1.0.0 (Mar. 2019), $3^{rd}$ Generation Partnership Project; Technical Specification Group Radio access Network; NR; Study on UE Power Saving (Release 16), 70 pgs.
3GPP TSG-RAN WG1 Meeting #95, Spokane, USA, Nov. 12-16, 2018, R1-1813882, Ericsson, "On the use of a preamble for NR-U", 15 pgs.
3GPP TSG RAN WG1 #97, Reno, USA, May 13-17, 2019, R1-1906172, Vivo, "Discussion on PDCCH monitoring skipping and PDCCH monitoring periodicity switch", 4 pgs.

* cited by examiner

SKIPPING MONITORING OF DOWNLINK CONTROL CHANNEL DURING RANDOM ACCESS PROCEDURE

CROSS REFERENCE TO RELATED APPLICATION

This patent application is a U.S. National Stage application of International Patent Application Number PCT/CN2019/085419 filed May 2, 2019, which is hereby incorporated by reference in its entirety.

FIELD

Embodiments of the present disclosure generally relate to the field of telecommunication and in particular, to a method, device, apparatus and computer readable storage medium for skipping monitoring of downlink (DL) control channel during random access (RA) procedure.

BACKGROUND

Skipping monitoring of downlink control channel is a method for reducing battery consumption by indicating a terminal device to skip monitoring of a DL control channel for a certain time period. If skipping of a DL control channel is supported, the terminal device may receive, during or prior to an RA procedure, a command indicating the terminal device to skip monitoring a DL control channel. Thus, it is needed to clarify how the terminal device should operate in respect to skipping monitoring of a DL control channel during an ongoing RA procedure.

SUMMARY

In general, example embodiments of the present disclosure provide a solution for skipping monitoring of a DL control channel during an RA procedure.

In a first aspect, there is provided a first device. The first device comprises at least one processor; and at least one memory including computer program codes; the at least one memory and the computer program codes are configured to, with the at least one processor, cause the first device to: receive from a second device a command indicating the first device to skip monitoring a downlink control channel between the second device and the first device for a time period; and in response to the random access procedure being triggered by a first trigger condition, determine whether the time period overlaps with a time window associated with a random access procedure; and ignore or perform the command based on the determination.

In a second aspect, there is provided a second device. The second device comprises at least one processor; and at least one memory including computer program codes; the at least one memory and the computer program codes are configured to, with the at least one processor, cause the second device to: transmit to a first device a command indicating the first device to skip monitoring a downlink control channel between the second device and the first device for a time period; wherein in response to the random access procedure being triggered by a first trigger condition, the command is ignored or performed by the first device based on a determination whether the time period overlaps with a time window associated with a random access procedure.

In a third aspect, there is provided a method implemented at a first device. The method comprises: receiving from a second device a command indicating the apparatus to skip monitoring a downlink control channel between the second device and the apparatus for a time period; and in response to the random access procedure being triggered by a first trigger condition, determining whether the time period overlaps with a time window associated with a random access procedure; and ignoring or performing the command based on the determination.

In a fourth aspect, there is provided a method implemented at a second device. The method comprises: transmitting to a first device a command indicating the first device to skip monitoring a downlink control channel between the apparatus and the first device for a time period; wherein in response to the random access procedure being triggered by a first trigger condition, the command is ignored or performed by the first device based on a determination whether the time period overlaps with a time window associated with a random access procedure.

In a fifth aspect, there is provided an apparatus comprising means for performing steps of the method according to the above third aspect.

In an sixth aspect, there is provided an apparatus comprising means for performing steps of the method according to the above fourth aspect.

In a seventh aspect, there is provided a non-transitory computer readable medium comprising a computer program for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
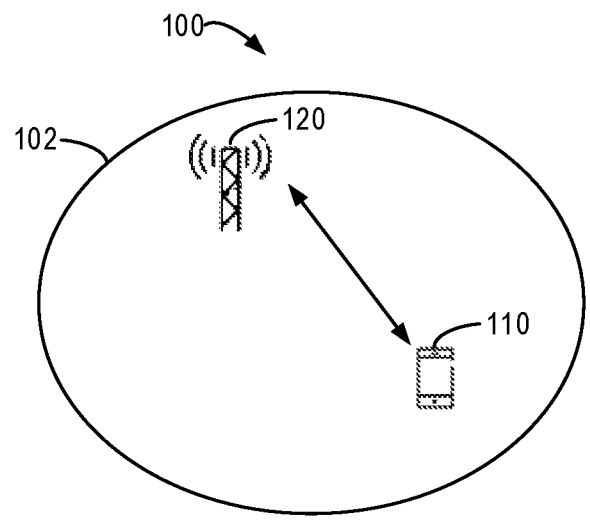
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the first device 110 and the second device 120 can communicate data and control information to each other. In the case where the first device 110 is the terminal device and the second device 120 is the network device, a link from the second device 120 to the first device 110 is referred to as a downlink (DL), while a link from the first device 110 to the second device 120 is referred to as an uplink (UL).

There is an ongoing initiative of 3GPP related to power savings of terminal devices in NR (such as power saving study item 3GPP RP-181463 and 3GPP TR 38.840). The aim of the 3GPP study is to achieve power savings of terminal devices primarily for enhanced mobile broadband (eMBB) scenarios. As part of the study, PDCCH monitoring skipping has been introduced.

To support power saving, the second device 120 may transmit a command indicating the first device 110 to skip monitoring a DL control channel for a time period. Skipping monitoring of a DL control channel is especially beneficial in the cases of scheduling gaps due to beam sweeping or other scheduling decision at the side of a transmitter. For example, the second device 120 may have a number of devices to schedule e.g. in distinct beams but the scheduling cannot be completed simultaneously. Similarly, skipping monitoring of a DL control channel is beneficial also in the cases when no data is available for the UE. The second device 120 may indicate to one or more of the devices that they are allowed to skip monitoring the DL control channel for a while, i.e. these devices will not be scheduled until a number of time slots, and thus, they may enter a sleep mode for battery saving.

Figure 2:
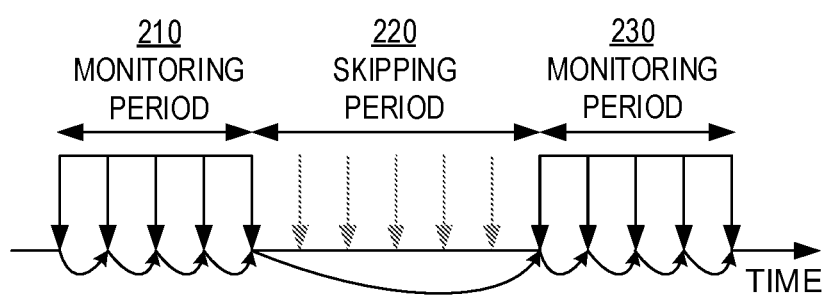
FIG. 2 illustrates a skipping monitoring of a DL control channel according to some example embodiments of the present disclosure.

FIG. 2 illustrates a skipping monitoring of a DL control channel according to some example embodiments of the present disclosure. As shown, in a scheduling period 210, the second device 120 schedules the first device 110 continuously. If the second device 120 will not schedule the first device 110 for a while, at the end of the scheduling period 210, the second device 120 may transmit to the first device 110 a skipping command indicating the first device 110 to skip monitoring a DL control channel for a time period 220. For the purpose of discussion, the time period in which the first device 110 skips monitoring a DL control channel is also referred to as a skipping period. The skipping period 220 may be indicated explicitly in the skipping command from the second device or could be configured upfront by the second device, e.g. via RRC signaling. For example, the skipping period 220 may include the number of monitoring occasions or time duration.

Upon expiration of the skipping period 220, the first device 110 resumes to monitor the DL control channel in a scheduling period 230.

If skipping monitoring of a DL control channel is supported, the second device 120 may transmit the skipping command to the first device 110 during and/or prior to an RA procedure. Thus, it is needed to clarify how the terminal device should operate in respect to skipping monitoring of a DL control channel during an ongoing RA procedure.

If skipping monitoring of a DL control channel is supported, the first device 110 may indicate to the second device 120 its support of skipping of a DL control channel e.g. by means of a UE capability message.

The second device 120 considers the capability of the first device 110 when configuring the PDCCH skipping command to the first device 110 and when scheduling/assigning radio resources to the first device 110 (accounting e.g. for the skipping period).

According to some example embodiments, there is provided a solution for skipping monitoring of a DL control channel during an RA procedure. According to the solution, the first device determines whether a skipping period indicated in a skipping command overlaps with a time window associated with an RA procedure. In turn, the first device ignores or performs the skipping command based on the determination. With this solution, if the skipping period does not entirely overlap with the time window associated with the RA procedure, the first device will perform the skipping command. Thus, the scheduling flexibility may be enabled. In addition, if the skipping period entirely overlaps with the time window, the first device will ignore the skipping command. Thus, reception of an RA response from a second device is ensured. On the other hand, if the skipping period partially overlaps with the time window, the first device will perform the skipping command until a start of the time window. In this way, the scheduling flexibility may be enabled and reception of the RA response is ensured.

Figure 3:
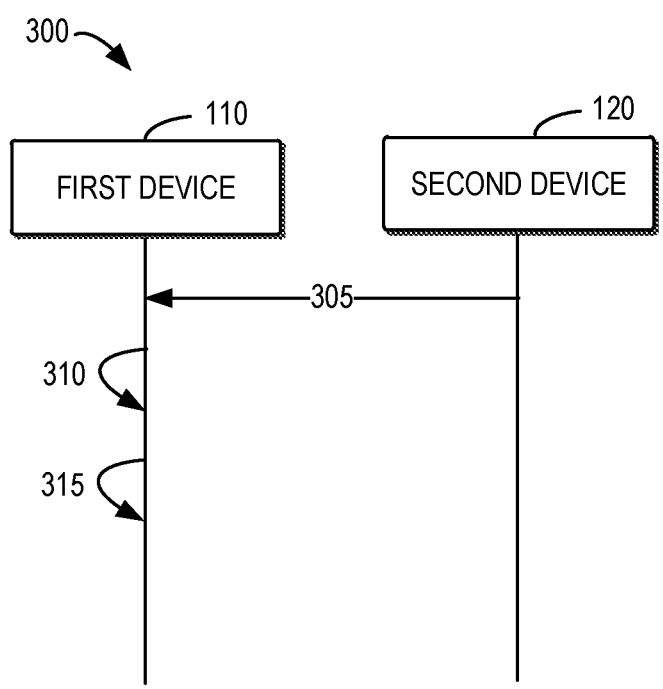
FIG. 3 illustrates a signaling chart illustrating a process for skipping monitoring of a DL control channel during an RA procedure according to some example embodiments of the present disclosure.

Reference is now made to FIG. 3, which shows a signaling chart illustrating a process 300 for skipping monitoring of a DL control channel during an RA procedure according to some example embodiments of the present disclosure. For the purpose of discussion, the process 300 will be described with reference to FIG. 1. The process 300 may involve the first device 110 and the second device 120 as illustrated in FIG. 1. Although the process 300 has been described in the communication system 100 of FIG. 1, this process may be likewise applied to other communication scenarios. Although skipping monitoring of a DL control channel configured for the first device is discussed, a similar process can be applied for skipping monitoring of a control channel of the second device.

The first device 110 receives in 305 a skipping command from a second device 120. The skipping command indicates the first device 110 to skip monitoring a DL control channel between the second device 120 and the first device 110 for a time period (which is also referred to as a skipping period).

In some example embodiments when the first device 110 is a terminal device and the second device 120 is a network device, the DL control channel to be monitored may be a physical downlink control channel (PDCCH). The PDCCH is called a scheduling channel in a sense that it carries scheduling information. Control information transmitted through the PDCCH is referred to as downlink control information (DCI). By monitoring the DL control channel, the first device 110 may determine when and/or how it is scheduled to receive data from the second device 120. The skipping command may be transmitted to the first device 110 in control information, such as in PDCCH.

The skipping command may be received when the first device 110 is in an ongoing RA procedure or is going to enter an RA procedure. As part of the RA procedure, the first device 110 needs to monitor the DL control channel in a time window associated with the RA procedure, so as to obtain from the second device 120 information necessary for the RA procedure. For the purpose of discussion, the time window associated with the RA procedure is also referred to as an RA time window.

If the RA procedure is by a first trigger condition, to ensure reception of the information necessary for the RA procedure, the first device 110 determines 310 whether the skipping period overlaps with the RA time window.

In some example embodiments, the first trigger condition comprises the first device 110 initiating the RA procedure as a contention-based RA. In some other example embodiments, the first trigger condition comprises the first device 110 initiating the RA procedure as a contention-free RA.

In some example embodiments, the RA time window may be an RA response window. In such embodiments, the first device 110 needs to monitor the DL control channel in the RA time window 420, so as to obtain an RA response from the second device 120.

In some other example embodiments, the RA time window may be a time window defined by a RA contention resolution timer. In such embodiments, the first device 110 needs to monitor the DL control channel in the RA time window, so as to obtain a contention resolution result from the second device 120. Alternatively, the first device 110 needs to monitor the DL control channel in the RA time window, so as to obtain from the second device 120 a retransmission grant for the scheduled transmission.

In some still other example embodiments, the RA time window may be a time window corresponding to the whole RA procedure time if there is an ongoing RA procedure.

The first device 110 ignores or performs 315 the skipping command based on the determination. To better understand actions performed by the first device 110 based on the determination, relationships between a skipping period and an RA time window will be described with reference to FIGS. 4A, 4B, 4C, 4D and 4E.

Figure 4A:
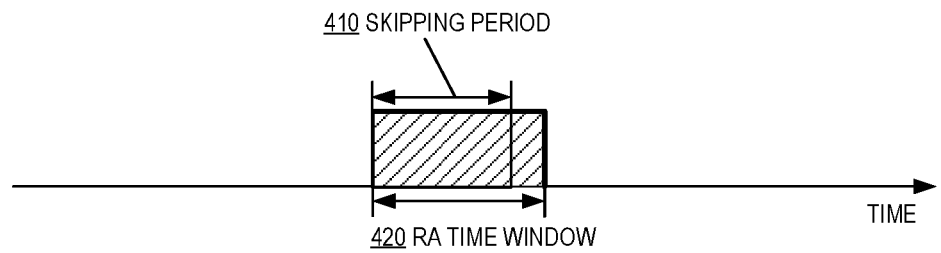
FIGS. 4A, 4B, 4C, 4D and 4E illustrate relationships between a skipping period and a time window associated with RA according to some example embodiments of the present disclosure.

As shown in FIG. 4A, a skipping period 410 entirely overlaps with an RA time window 420. In this case, if the first device 110 performs the skipping command to skip monitoring the DL control channel, the first device 110 cannot obtain information necessary for the RA procedure from the second device 120. Thus, in order to ensure the reception of information necessary for the RA procedure, the first device 110 ignores the skipping command.

Figure 4B:
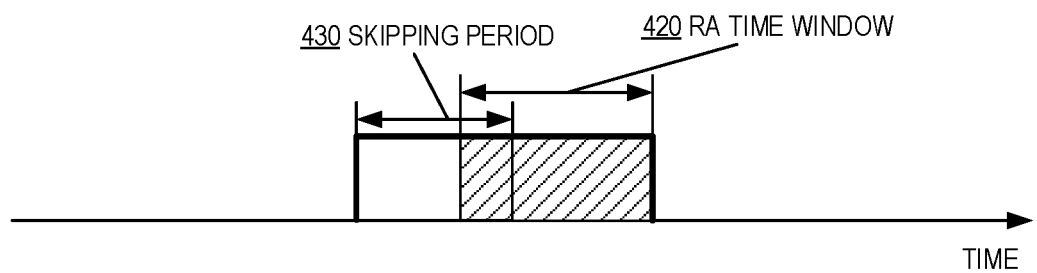

As shown in FIG. 4B, a skipping period 430 partially overlaps with the RA time window 420 and a start of the skipping period 430 is earlier than a start of the RA time window 420. In this case, in order to ensure the reception of information necessary for the RA procedure, the first device 110 performs the skipping command until the start of the RA time window 420.

Figure 4C:
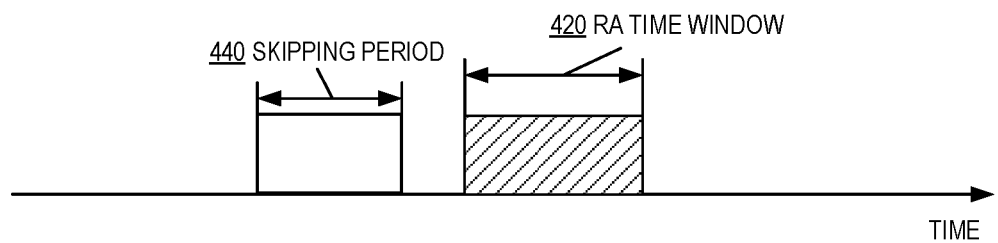

As shown in FIG. 4C, a skipping period 440 does not overlap with the RA time window 420. In this case, the first device 110 performs the skipping command. In this way, the scheduling flexibility may be enabled.

Figure 4D:
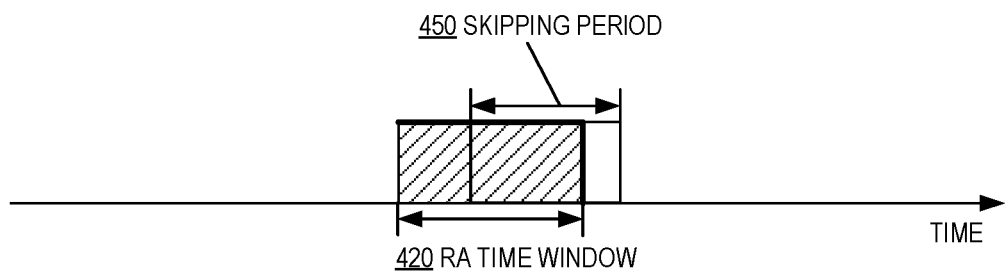

As shown in FIG. 4D, a skipping period 450 partially overlaps with the RA time window 420 and the start of the time window 420 is earlier than a start of the skipping period 450. In this case, in order to ensure the reception of information necessary for the RA procedure, the first device 110 performs the skipping command until an end of the RA time window 420.

Figure 4E:
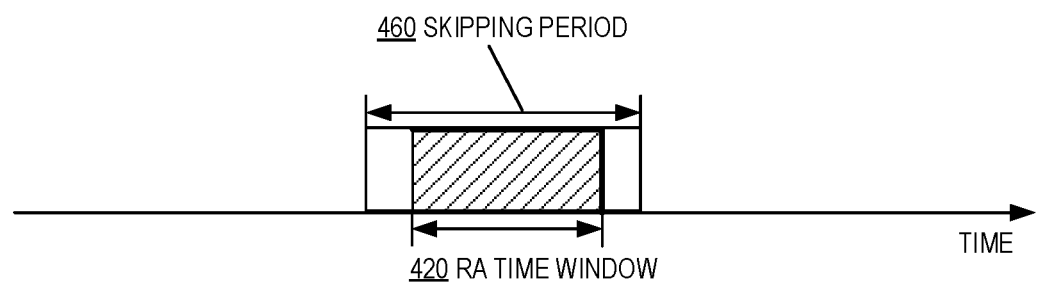

As shown in FIG. 4E, a skipping period 460 partially overlaps with the RA time window 420 and the RA time window 420 is within the skipping period 460. In this case, in order to ensure the reception of information necessary for the RA procedure, the first device 110 performs the skipping command until the start of the RA time window 420 and performs the skipping command after the end of the RA time window 420.

In some example embodiments, the RA procedure is triggered by a trigger condition. Examples of the trigger conditions may include, but are not limited to; RRC Connection Re-establishment procedure; UL data arrival during RRC_CONNECTED when UL synchronisation status is "non-synchronised"; UL data arrival during RRC_CONNECTED when there are no Physical Uplink Control Channel (PUCCH) resources for Scheduling Request (SR) available; SR failure; Request by RRC upon synchronous reconfiguration (e.g. handover); transition from RRC INACTIVE; to establish time alignment at SCell addition; request for Other System Information (SI); and beam failure recovery (BFR).

Figure 5:
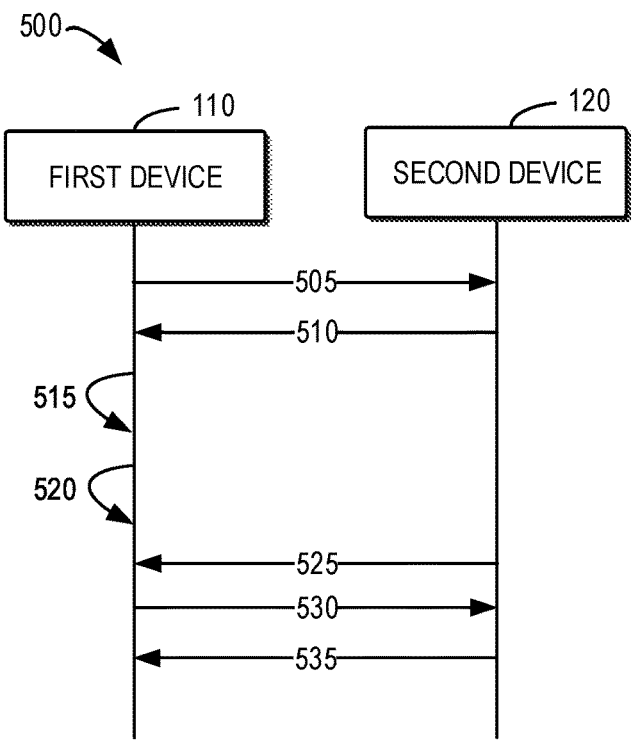
FIG. 5 illustrates a signaling chart illustrating a process for skipping monitoring of a DL control channel during an RA procedure according to some other example embodiments of the present disclosure.

To better understand how skipping monitoring of a DL control channel works together with the RA procedure, a signaling chart illustrating a process 500 for skipping monitoring of a DL control channel during an RA procedure according to some other example embodiments of the present disclosure will be described with reference to FIG. 5. For the purpose of discussion, the process 500 will be described with reference to FIG. 1. The process 500 may involve the first device 110 and the second device 120 as illustrated in FIG. 1. The process 500 may be considered as an example implementation of the process 300.

In the process 500, the RA procedure is initiated by the first device 110, and may be a contention-based RA procedure or a contention-free RA procedure.

The first device 110 transmits 505 an RA preamble to the second device 120 so as to initiate an RA procedure. Upon reception of the RA preamble, the second device 120 may estimate transmission timing of the first device 110 to enable uplink synchronization of the first device 110.

If the second device 120 will not schedule the first device 110 for a while, the second device 120 may transmit 510 a skipping command to the first device 110. The skipping command indicates the first device 110 to skip monitoring the DL control channel for a skipping period.

Upon reception of the skipping command, the first device 110 determines 515 whether the skipping period overlaps with an RA time window. For example, in this example implementation, the first device 110 may determine whether the skipping period overlaps with an RA response window.

If the first device 110 determines that the skipping period entirely overlaps with the RA response window, the first device 110 may ignore 520 the skipping command. Thus, the reception of the RA response is ensured.

On the other hand, if the first device 110 determines that the skipping period partially overlaps with the RA response window, the first device 110 may perform 520 the skipping command until a start of the RA response window. In this way, the scheduling flexibility may be enabled and the reception of the RA response is ensured.

Alternatively, if the first device 110 determines that the skipping period does not overlap with the RA response window, the first device 110 may perform 520 the skipping command. As such, the scheduling flexibility may be enabled.

Based on the estimated transmission timing of the first device 110, the second device 120 transmits 525 an RA response to the first device 110. The RA response may include information about timing advance for the first device 110, and UL resources to be used by the first device 110 in an action of 530.

Upon reception of the RA response, the first device 110 transmits 530 to the second device 120 a scheduled transmission by using the UL resources indicated in the RA response. The scheduled transmission includes a Cell Radio Network Temporary Identifier (C-RNTI) of the first device 110.

If the first device 110 is successful in the contention, the second device 120 may transmit 535 a contention resolution message to the first device 110. The contention resolution message includes the C-RNTI of the first device 110. For example, a payload of the contention resolution message may be scrambled with the C-RNTI of the first device 110.

It is to be understood that although the process 500 has been described in connection with the RA response window, a similar process can be applied to a time window defined by RA contention resolution timer.

It is also to be understood that although the process 500 has been described by taking a 4-step RA procedure for example, a similar process may be applied to a 2-step RA procedure.

It is further to be understood that although the process 500 has been described by taking the action 505 occurring prior to the action 510, in other example implementations, the action 505 may occur subsequent to the action 510.

In some example embodiments, the RA procedure may be initiated for beam failure recovery. For beam failure detection, a network device configures a terminal device with beam failure detection reference signals (SSB or CSI-RS) and the terminal device declares beam failure when the number of beam failure instance indications from the physical layer reaches a configured threshold before a configured timer expires.

SSB-based Beam Failure Detection is based on the SSB associated to the initial DL bandwidth part (BWP) and can only be configured for the initial DL BWPs and for DL BWPs containing the SSB associated to the initial DL BWP. For other DL BWPs, Beam Failure Detection can only be performed based on CSI-RS.

After beam failure is detected, the terminal device may trigger beam failure recovery by initiating an RA procedure on the PCell. In addition, the terminal device may select a suitable beam to perform beam failure recovery. If the network device has provided dedicated RA resources for certain beams, those will be prioritized by the terminal device. Upon completion of the RA procedure, beam failure recovery is considered complete.

Figure 6:
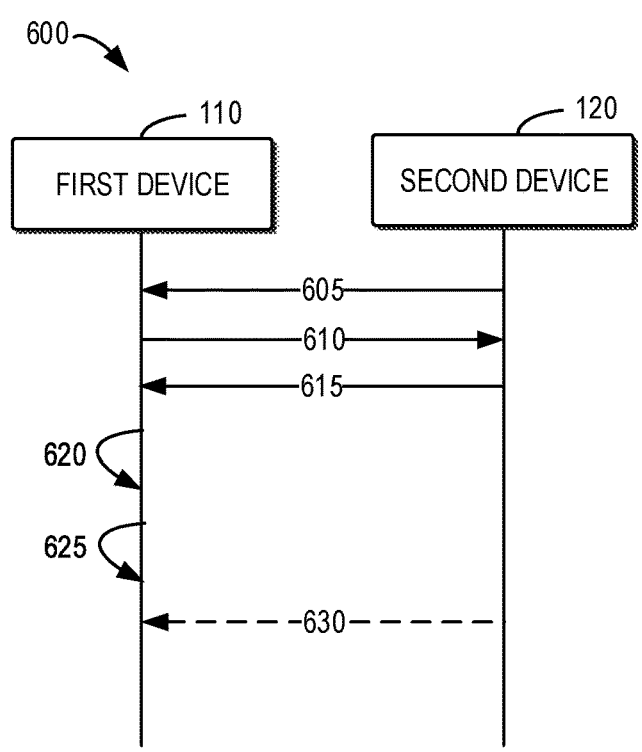
FIG. 6 illustrates a signaling chart illustrating a process for skipping monitoring of a DL control channel during an RA procedure according to still other example embodiments of the present disclosure.

Reference is now made to FIG. 6, which shows a signaling chart illustrating a process 600 for skipping monitoring of a DL control channel during an RA procedure according to some example embodiments of the present disclosure. For the purpose of discussion, the process 600 will be described with reference to FIG. 1. The process 600 may involve the first device 110 and the second device 120 as illustrated in FIG. 1. The process 600 may be considered as an example implementation of the process 300.

In the process 600, the RA procedure is initiated by the first device 110 for beam failure recovery, and may be a contention-free RA procedure.

The second device 120 transmits 605 to the first device 110 a dedicated RA preamble and information about a dedicated physical random access channel (PRACH) resource.

The first device 110 transmits 610 to the second device 120 the dedicated RA preamble on the dedicated PRACH resource.

If the second device 120 will not schedule the first device 110 for a while, the second device 120 may transmit 615 a skipping command to the first device 110. The skipping command indicates the first device 110 to skip monitoring the DL control channel for a skipping period.

In some example embodiments, the second device 120 may transmit the skipping command via a dedicated message on the DL control channel. For example, the dedicated message may include a PDCCH order. In some other example embodiments, the second device 120 may transmit the skipping command via a handover command.

Upon reception of the skipping command, the first device 110 determines 620 whether the skipping period overlaps with an RA time window. For example, in this example implementation, the first device 110 may determine whether the skipping period overlaps with an RA response window.

If the first device 110 determines that the skipping period entirely overlaps with the RA response window, the first device 110 may ignore 625 the skipping command. On the other hand, if the first device 110 determines that the skipping period partially overlaps with the RA response window, the first device 110 may perform 625 the skipping command until a start of the RA response window. Alternatively, if the first device 110 determines that the skipping period does not overlap with the RA response window, the first device 110 may perform 625 the skipping command.

In some example embodiments, the second device 120 transmits 630 an RA response to the first device 110 in a search space associated with the beam failure recovery. For example, the search space may be indicated by a recovery-SearchSpaceId. The second device 120 may configure the first device 110 with the recoverySearchSpaceId prior to the RA procedure. The RA response includes the C-RNTI of the first device 110. In addition, if the second device 120 has DL data to be transmitted to the first device 110, the RA response may include DL scheduling information. Alternatively, if the second device 120 has UL data to be received from the first device 110, the RA response may include UL scheduling information.

Alternatively, upon reception of the dedicated RA preamble, if the second device 120 has no DL data to be transmitted to the first device 110 or no UL data to be received from the first device 110, the second device 120 may not transmit the RA response. Instead, the second device 120 may only transmit the skipping command. The skipping command comprises the C-RNTI of the first device 110 and indicates a successful completion of the RA. For example, when the skipping command is sent through a DCI, the DCI may be scrambled with the C-RNTI of the first device 110.

Figure 7:
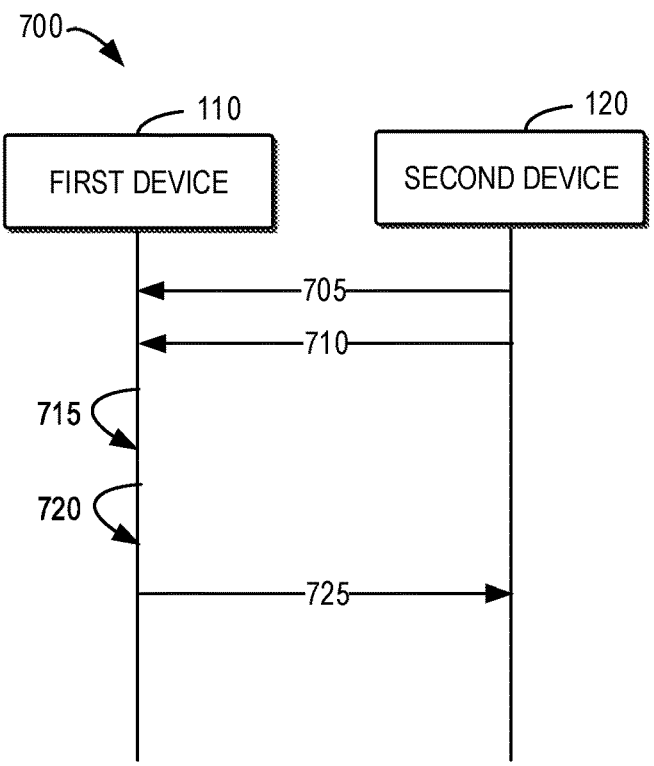
FIG. 7 illustrates a signaling chart illustrating a process for skipping monitoring of a DL control channel during an RA procedure according to yet other example embodiments of the present disclosure.

Reference is now made to FIG. 7, which shows a signaling chart illustrating a process 700 for skipping monitoring of a DL control channel during an RA procedure according to some example embodiments of the present disclosure. For the purpose of discussion, the process 700 will be described with reference to FIG. 1. The process 700 may involve the first device 110 and the second device 120 as illustrated in FIG. 1. The process 700 may be considered as an example implementation of the process 300.

In the process 700, the RA procedure is initiated by the second device 120, and may be a contention-based RA procedure or a contention-free RA procedure.

The second device 120 transmits 705 to the first device 110 an indication indicating the first device 110 transmits a RA request to the second device 120. In some example embodiments, the second device 120 may transmit the indication via a dedicated message on the DL control channel. For example, the dedicated message may include a PDCCH order. In some other example embodiments, the second device 120 may transmit the indication via a handover command.

If a dedicated RA preamble is available, the second device 120 may transmit the dedicated RA preamble in the indication to the first device 110.

If the second device 120 will not schedule the first device 110 for a while, the second device 120 transmits 710 a skipping command to the first device 110. The skipping command indicates the first device 110 to skip monitoring the DL control channel for a skipping period.

In some example embodiments, the second device 120 may transmit the skipping command and the indication indicating the first device 110 transmits the RA request simultaneously. In some other example embodiments, the second device 120 may transmit the skipping command subsequent to the indication.

Upon reception of the skipping command, the first device 110 determines 715 whether there is an ongoing RA procedure. If the first device 110 determines that there is an ongoing RA procedure, the first device 110 stops the ongoing RA procedure, performs 720 the skipping command, and initiates 725 a new RA procedure upon expiration of the skipping period. On the other hand, if the first device 110 determines that there is no ongoing RA procedure, the first device 110 performs 720 the skipping command and initiates 725 an RA procedure upon expiration of the skipping period.

It is also to be understood that although the process 700 has been described by taking a 4-step RA procedure for example, a similar process may be applied to a 2-step RA procedure.

Figure 8:
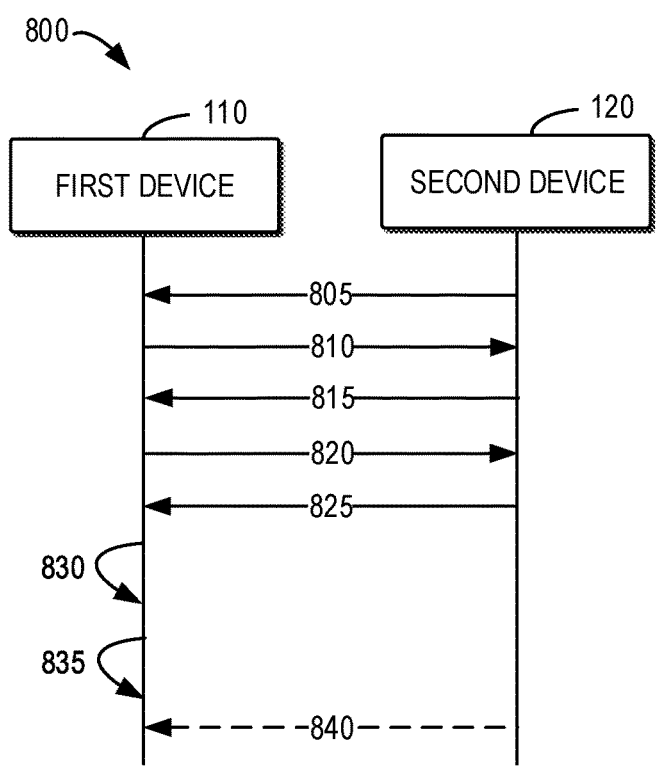
FIG. 8 illustrates a signaling chart illustrating a process for skipping monitoring of a DL control channel during an RA procedure according to other example embodiments of the present disclosure.

Reference is now made to FIG. 8, which shows a signaling chart illustrating a process 800 for skipping monitoring of a DL control channel during an RA procedure according to some example embodiments of the present disclosure. For the purpose of discussion, the process 800 will be described with reference to FIG. 1. The process 800 may involve the first device 110 and the second device 120 as illustrated in FIG. 1. The process 800 may be considered as an example implementation of the process 300.

In the process 800, the RA procedure is initiated by the second device 120 for handover, and may be a contention-based RA procedure.

The second device 120 transmits 805 to the first device 110 an indication indicating the first device 110 transmits a RA request to the second device 120. In some example embodiments, the second device 120 may transmit the indication via a dedicated message on the DL control channel. For example, the second device 120 may transmit the indication via a handover command.

The first device 110 transmits 810 an RA request to the second device 120. The second device 120 transmits 815 an RA response to the first device 110. The first device 110 transmits 820 a scheduled transmission to the second device 120.

If the second device 120 will not schedule the first device 110 for a while, the second device 120 transmits 825 a skipping command to the first device 110. The skipping command indicates the first device 110 to skip monitoring the DL control channel for a skipping period.

Upon reception of the skipping command, the first device 110 determines 830 whether the skipping period overlaps with an RA time window. For example, in this example implementation, the first device 110 may determine whether the skipping period overlaps with a time window defined by RA contention resolution timer.

If the first device 110 determines that the skipping period entirely overlaps with the time window defined by RA contention resolution timer, the first device 110 may ignore 835 the skipping command. On the other hand, if the first device 110 determines that the skipping period partially overlaps with the time window defined by RA contention resolution timer, the first device 110 may perform 835 the skipping command until a start of the time window defined by RA contention resolution timer. Alternatively, if the first device 110 determines that the skipping period does not overlap with the time window defined by RA contention resolution timer, the first device 110 may perform 835 the skipping command.

Upon expiration of the skipping period, the first device 110 continues to monitor the DL control channel.

If the first device 110 is successful in the contention, the second device 120 may transmit 840 a contention resolution message to the first device 110. The contention resolution message includes the C-RNTI of the first device 110. In addition, if the second device 120 has DL data to be transmitted to the first device 110, the contention resolution message may include DL scheduling information.

Alternatively, upon reception of the scheduled transmission, if the second device 120 has no DL data to be transmitted to the first device 110, the second device 120 may not transmit the contention resolution message. Instead, the second device 120 may only transmit the skipping command. The skipping command comprises the C-RNTI of the first device 110 and indicates a successful contention resolution for the first device. For example, a payload of the skipping command may be scrambled with the C-RNTI of the first device 110.

Figure 9:
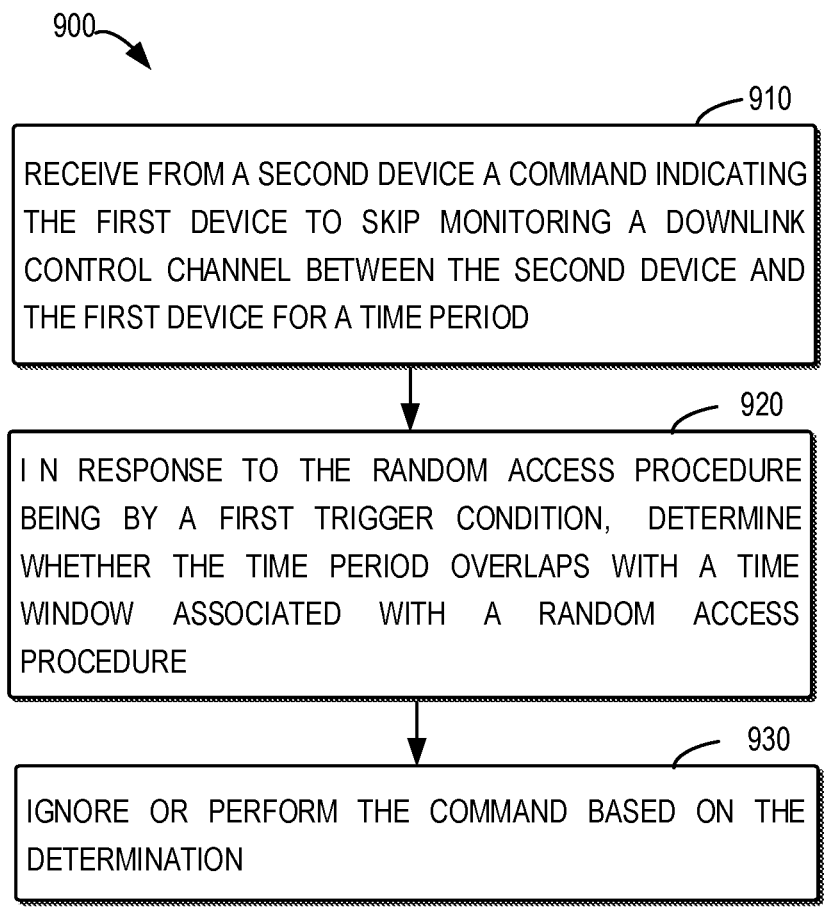
FIG. 9 illustrates a flowchart of a method implemented at a first device according to some example embodiments of the present disclosure.

FIG. 9 shows a flowchart of an example method 900 implemented at a first device in accordance with some example embodiments of the present disclosure. For the purpose of discussion, the method 900 will be described from the perspective of the first device 110 with reference to FIG. 1. It would be appreciated that the method 900 may also be implemented at the second device 120 in FIG. 1.

At block 910, the first device 110 receives from a second device a command indicating the first device 110 to skip monitoring a downlink control channel between the second device and the first device 110 for a time period.

At block 920, in response to the random access procedure being triggered by a first trigger condition, the first device 110 determines whether the time period overlaps with a time window associated with a random access procedure.

At block 930, the first device 110 ignores or performs the command based on the determination.

In some example embodiments, ignoring or performing the command based on the determination comprises at least one of: in response to a determination that the time period entirely overlaps with the time window, ignoring the command; in response to a determination that the time period partially overlaps with the time window and a start of the time period is earlier than a start of the time window, performing the command until the start of the time window; in response to a determination that the time period partially overlaps with the time window and the start of the time window is identical to or earlier than the start of the time period, performing the command until an end of the time window; in response to a determination that the time period partially overlaps with the time window and the time window is within the time period, performing the command until the start of the time window and performing the command after the end of the time window; and in response to a determination that the time period fails to overlap with the time window, performing the command.

In some example embodiments, the time window is associated with one of a random access response and a contention resolution for the random access procedure.

In some example embodiments, the random access procedure is an ongoing random access procedure, and the time window corresponds to a whole random access procedure time of the ongoing RA procedure.

In some example embodiments, the first trigger condition comprises the first device 110 initiating the random access procedure as a contention-based random access.

In some example embodiments, the first trigger condition comprises the first device 110 initiating the random access procedure as a contention-free random access.

In some example embodiments, the method 900 further comprises: in response to the random access procedure being triggered by a second trigger condition, perform the command.

In some example embodiments, the second trigger condition comprises the first device 110 initiating the contention-free random access procedure for beam failure recovery.

In some example embodiments, receiving the command comprises: receiving the command in a search space associated with the beam failure recovery, the command comprising a Cell Radio Network Temporary Identifier (C-RNTI) of the first device 110 and indicating a successful contention resolution for the first device 110.

In some example embodiments, the second trigger condition comprises the second device initiating the random access procedure; and the method 900 further comprises receiving from the second device an indication indicating the first device 110 transmits a random access request to the second device.

In some example embodiments, receiving the command comprises: receiving a dedicated message on the downlink control channel, the dedicated message comprising the indication.

In some example embodiments, receiving the command comprises: receiving the command and the dedicated message simultaneously.

In some example embodiments, the method 900 further comprises upon expiration of the time period, transmit the random access request to the second device.

In some example embodiments, receiving the command comprises: receiving the command subsequent to the dedicated message.

In some example embodiments, the method 900 further comprises stopping the random access procedure; and upon expiration of the time period, initiating a further random access procedure.

In some example embodiments, the random access procedure comprises a contention-based random access; and receiving the indication comprises receiving a handover command comprising the indication.

In some example embodiments, receiving the command comprises: receiving the command subsequent to a scheduled transmission to the second device, the command comprising a Cell Radio Network Temporary Identifier of the first device 110.

In some example embodiments, receiving the command comprises: receiving the command indicating a successful contention resolution for the first device 110.

In some example embodiments, the method 900 further comprises upon expiration of the time period, monitor the downlink control channel.

Figure 10:
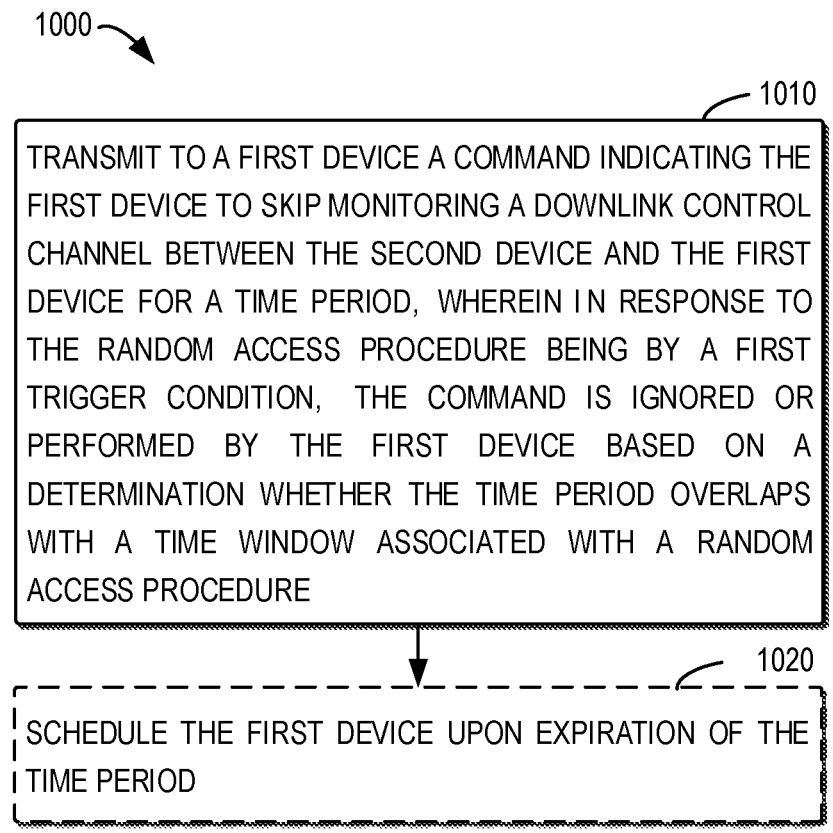
FIG. 10 illustrates a flowchart of a method implemented at a second device according to some example embodiments of the present disclosure.

FIG. 10 shows a flowchart of an example method 1000 implemented at a second device in accordance with some example embodiments of the present disclosure. For the purpose of discussion, the method 1000 will be described from the perspective of the second device 120 with reference to FIG. 1. It would be appreciated that the method 1000 may also be implemented at the first device 110 in FIG. 1.

At block 1010, the second device 120 transmits to a first device a command indicating the first device to skip monitoring a downlink control channel between the second device 120 and the first device for a time period. In response to the random access procedure being triggered by a first trigger condition, the command is ignored or performed by the first device based on a determination whether the time period overlaps with a time window associated with a random access procedure.

Optionally, at block 1020, the second device 120 schedules the first device upon expiration of the time period.

In some example embodiments, the command is ignored or performed by the first device based on a determination by at least one of: in response to a determination that the time period entirely overlaps with the time window, ignoring the command; in response to a determination that the time period partially overlaps with the time window and a start of the time period is earlier than a start of the time window, performing the command until the start of the time window; in response to a determination that the time period partially overlaps with the time window and the start of the time window is identical to or earlier than the start of the time period, performing the command until an end of the time window; in response to a determination that the time period partially overlaps with the time window and the time window is within the time period, performing the command until the start of the time window and performing the command after the end of the time window; and in response to a determination that the time period fails to overlap with the time window, performing the command.

In some example embodiments, the time window is associated with one of a random access response and a contention resolution for the random access procedure.

In some example embodiments, the random access procedure is an ongoing random access procedure, and the time window corresponds to a whole random access procedure time of the ongoing RA procedure.

In some example embodiments, the first trigger condition comprises the first device initiating the random access procedure as a contention-based random access.

In some example embodiments, the first trigger condition comprises the first device initiating the random access procedure as a contention-free random access.

In some example embodiments, in response to the random access procedure being triggered by a second trigger condition, the command is performed.

In some example embodiments, the second trigger condition comprises the first device initiating the contention-free random access procedure for beam failure recovery.

In some example embodiments, transmitting the command comprises: transmitting the command in a search space associated with the beam failure recovery, the command comprising a Cell Radio Network Temporary Identifier (C-RNTI) of the first device and indicating a successful contention resolution for the first device.

In some example embodiments, the second trigger condition comprises the second device 120 initiating the random access procedure; and the method 1000 further comprises: transmitting to the first device an indication indicating the first device transmits a random access request to the second device 120.

In some example embodiments, transmitting the indication comprises: transmitting a dedicated message on the downlink control channel, the dedicated message comprising the indication.

In some example embodiments, transmitting the command comprises: transmitting the command and the dedicated message simultaneously.

In some example embodiments, the method 1000 further comprises: upon expiration of the time period, receive the random access request from the first device.

In some example embodiments, transmitting the command comprises: transmitting the command subsequent to the dedicated message.

In some example embodiments, the random access procedure comprises a contention-based random access; and transmitting the indication comprises transmitting a handover command comprising the indication.

In some example embodiments, transmitting the command comprises: in response to reception of a scheduled transmission from the first device, transmitting the command comprising a Cell Radio Network Temporary Identifier of the first device.

In some example embodiments, transmitting the command comprises: transmitting the command indicating a successful contention resolution for the first device.

In some example embodiments, an apparatus capable of performing any of the method 900 (for example, the first device 110 or the second device 120) may comprise means for performing the respective steps of the method 900. The means may be implemented in any suitable form. For example, the means may be implemented in a circuitry or software module.

In some example embodiments, the apparatus comprises means for receiving from a second device a command indicating the apparatus to skip monitoring a downlink control channel between the second device and the apparatus for a time period; and means for determining whether the time period overlaps with a time window associated with a random access procedure; and means for ignoring or performing the command based on the determination.

In some example embodiments, means for ignoring or performing the command based on the determination comprises means for at least one of: in response to a determination that the time period entirely overlaps with the time window, ignoring the command; in response to a determination that the time period partially overlaps with the time window and a start of the time period is earlier than a start of the time window, performing the command until the start of the time window; in response to a determination that the time period partially overlaps with the time window and the start of the time window is identical to or earlier than the start of the time period, performing the command until an end of the time window; in response to a determination that the time period partially overlaps with the time window and the time window is within the time period, performing the command until the start of the time window and performing the command after the end of the time window; and in response to a determination that the time period fails to overlap with the time window, performing the command.

In some example embodiments, the time window is associated with one of a random access response and a contention resolution for the random access procedure.

In some example embodiments, the random access procedure is an ongoing random access procedure, and the time window corresponds to a whole random access procedure time of the ongoing RA procedure.

In some example embodiments, the first trigger condition comprises the apparatus initiating the random access procedure as a contention-based random access.

In some example embodiments, the first trigger condition comprises the apparatus initiating the random access procedure as a contention-free random access.

In some example embodiments, the apparatus further comprises in response to the random access procedure being triggered by a second trigger condition, means for performing the command.

In some example embodiments, the second trigger condition comprises the apparatus initiating the random access procedure as a contention-free random access.

In some example embodiments, the second trigger condition comprises the apparatus initiating the contention-free random access procedure for beam failure recovery.

In some example embodiments, means for receiving the command comprises: means for receiving the command in a search space associated with the beam failure recovery, the command comprising a Cell Radio Network Temporary Identifier (C-RNTI) of the apparatus and indicating a successful contention resolution for the apparatus.

In some example embodiments, the second trigger condition comprises the second device initiating the random access procedure; and the apparatus further comprises means for receiving from the second device an indication indicating the apparatus transmits a random access request to the second device.

In some example embodiments, means for receiving the command comprises: means for receiving a dedicated message on the downlink control channel, the dedicated message comprising the indication.

In some example embodiments, means for receiving the command comprises: means for receiving the command and the dedicated message simultaneously.

In some example embodiments, the apparatus further comprises upon expiration of the time period, means for transmitting the random access request to the second device.

In some example embodiments, means for receiving the command comprises: means for receiving the command subsequent to the dedicated message.

In some example embodiments, the apparatus further comprises means for stopping the random access procedure; and upon expiration of the time period, means for initiating a further random access procedure.

In some example embodiments, the random access procedure comprises a contention-based random access; and means for receiving the indication comprises means for receiving a handover command comprising the indication.

In some example embodiments, means for receiving the command comprises: means for receiving the command subsequent to a scheduled transmission to the second device, the command comprising a Cell Radio Network Temporary Identifier of the apparatus.

In some example embodiments, means for receiving the command comprises: means for receiving the command indicating a successful contention resolution for the apparatus.

In some example embodiments, the apparatus further comprises upon expiration of the time period, means for monitoring the downlink control channel.

In some example embodiments, an apparatus capable of performing any of the method 1000 (for example, the first device 110 or the second device 120) may comprise means for performing the respective steps of the method 1000. The means may be implemented in any suitable form. For example, the means may be implemented in a circuitry or software module.

In some example embodiments, the apparatus comprises means for transmitting to a first device a command indicating the first device to skip monitoring a downlink control channel between the apparatus and the first device for a time period; wherein the command is ignored or performed by the first device based on a determination whether the time period overlaps with a time window associated with a random access procedure.

In some example embodiments, the command is ignored or performed by the first device based on a determination by at least one of: in response to a determination that the time period entirely overlaps with the time window, ignoring the command; in response to a determination that the time period partially overlaps with the time window and a start of the time period is earlier than a start of the time window, performing the command until the start of the time window; in response to a determination that the time period partially overlaps with the time window and the start of the time window is identical to or earlier than the start of the time period, performing the command until an end of the time window; in response to a determination that the time period partially overlaps with the time window and the time window is within the time period, performing the command until the start of the time window and performing the command after the end of the time window; and in response to a determination that the time period fails to overlap with the time window, performing the command.

In some example embodiments, the time window is associated with one of a random access response and a contention resolution for the random access procedure.

In some example embodiments, the random access procedure is an ongoing random access procedure, and the time window corresponds to a whole random access procedure time of the ongoing RA procedure.

In some example embodiments, the first trigger condition comprises the first device initiating the random access procedure as a contention-based random access.

In some example embodiments, the first trigger condition comprises the first device initiating the random access procedure as a contention-free random access.

In some example embodiments, in response to the random access procedure being triggered by a second trigger condition, the command is performed.

In some example embodiments, the second trigger condition comprises the first device initiating the random access procedure as a contention-free random access procedure for beam failure recovery.

In some example embodiments, means for transmitting the command comprises: means for transmitting the command in a search space associated with the beam failure recovery, the command comprising a Cell Radio Network Temporary Identifier (C-RNTI) of the first device and indicating a successful contention resolution for the first device.

In some example embodiments, the second trigger condition comprises the apparatus initiating the random access procedure; and the apparatus further comprises: means for transmitting to the first device an indication indicating the first device transmits a random access request to the apparatus.

In some example embodiments, means for transmitting the indication comprises: means for transmitting a dedicated message on the downlink control channel, the dedicated message comprising the indication.

In some example embodiments, means for transmitting the command comprises: means for transmitting the command and the dedicated message simultaneously.

In some example embodiments, the apparatus further comprises: upon expiration of the time period, means for receiving the random access request from the first device.

In some example embodiments, means for transmitting the command comprises:

means for transmitting the command subsequent to the dedicated message.

In some example embodiments, the random access procedure comprises a contention-based random access; and means for transmitting the indication comprises means for transmitting a handover command comprising the indication.

In some example embodiments, means for transmitting the command comprises: in response to reception of a scheduled transmission from the first device, means for transmitting the command comprising a Cell Radio Network Temporary Identifier of the first device.

In some example embodiments, means for transmitting the command comprises: means for transmitting the command indicating a successful contention resolution for the first device.

Figure 11:
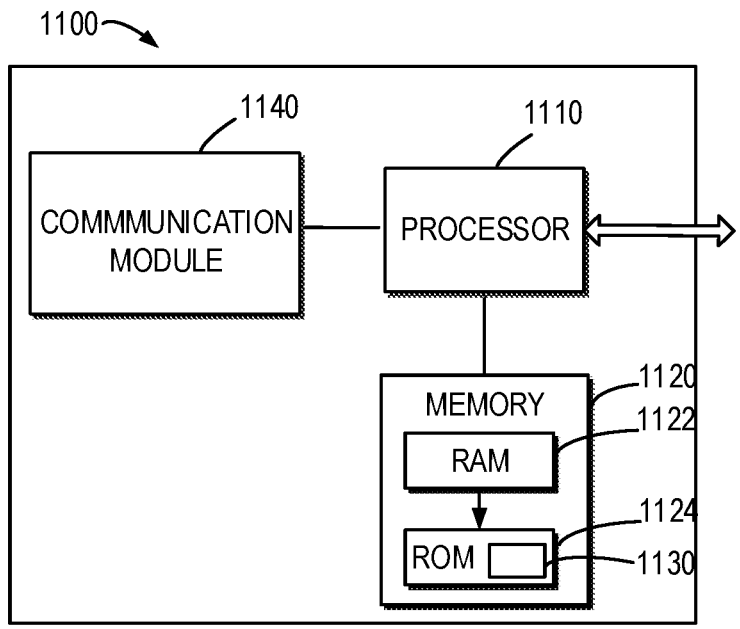
FIG. 11 illustrates a simplified block diagram of an apparatus that is suitable for implementing embodiments of the present disclosure.

FIG. 11 is a simplified block diagram of a device 1100 that is suitable for implementing embodiments of the present disclosure. The device 1100 may be provided to implement the communication device, for example the first device 110, the first device 111 or the second device 120 as shown in FIG. 1. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIGS. 2 to 10. The embodiments of the present disclosure may also be implemented by hardware or by a combination of software and hardware.

Figure 12:
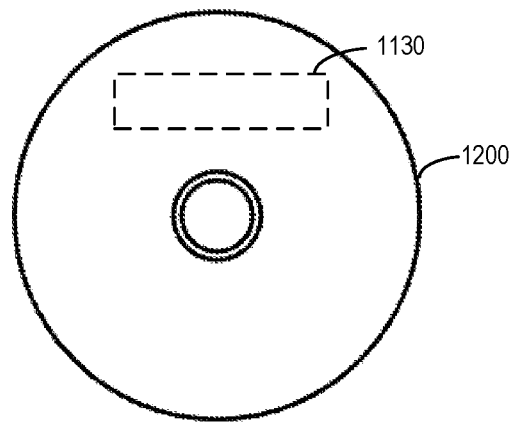
FIG. 12 illustrates a block diagram of an example computer readable medium in accordance with some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900 and 1000 as described above with reference to FIGS. 9 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one non-transitory memory including computer program code;
   the at least one memory and the computer program code configured to, with the at least one processor, cause the first device to:
   receive from a second device a command indicating the first device to skip monitoring a downlink control channel between the second device and the first device for a time period;
   determine whether the time period overlaps with a time window associated with one of:
   reception of a random access procedure or
   reception of a contention resolution, and
   based on a determined overlap of the time period with the time window, ignore the received command to skip monitoring the downlink control channel; or
   based on no determined overlap of the time period with the time window, perform the received command to skip monitoring the downlink control channel.

2. The first device of claim 1, wherein the command is at least one of
   ignored in response to a determination that the time period entirely overlaps with the time window, ignoring the command;
   ignored in response to a determination that the time period partially overlaps with the time window and a start of the time period is earlier than a start of the time window, performing the command until the start of the time window;
   in response to a determination that the time period partially overlaps with the time window and the start of the time window is identical to or earlier than the start of the time period, performing the command until an end of the time window;
   in response to a determination that the time period partially overlaps with the time window and the time window is within the time period, performing the command until the start of the time window and performing the command after the end of the time window; or
   in response to a determination that the time period fails to overlap with the time window, performing the command.

3. The first device of claim 1, wherein the time window is associated with one of a random access response and a contention resolution for the random access procedure.

4. The first device of claim 1, wherein the random access procedure is an ongoing random access procedure, and the time window corresponds to a whole random access procedure time of the ongoing random access procedure, wherein the first trigger condition comprises one of the first device initiating the random access procedure as a contention-based random access, or the first device initiating the random access procedure as a contention-free random access.

5. The first device of claim 1, wherein the first device is further caused to:
   in response to the random access procedure being triggered by a second trigger condition, perform the command,
   wherein the second trigger condition comprises the first device initiating the random access procedure as a contention-free random access procedure for beam failure recovery,
   wherein the first device is caused to receive the command by: receiving the command in a search space associated with the beam failure recovery, the command comprising a cell radio network temporary identifier of the first device and indicating a successful contention resolution for the first device.

6. The first device of claim 1:
   wherein the first device is further caused to: in response to the random access procedure being triggered by a second trigger condition, perform the command,
   wherein the second trigger condition comprises the second device initiating the random access procedure; and the first device is further caused to receive from the second device an indication indicating the first device transmits a random access request to the second device,
   wherein the first device is caused to receive the indication by: receiving a dedicated message on the downlink control channel, the dedicated message comprising the indication,
   wherein the first device is caused to receive the command by: receiving the command and the dedicated message simultaneously,
   wherein the first device is further caused to: upon expiration of the time period, transmit the random access request to the second device.

7. The first device of claim 1,
   wherein the first device is further caused to: in response to the random access procedure being triggered by a second trigger condition, perform the command, wherein the second trigger condition comprises the second device initiating the random access procedure;

wherein the first device is further caused to receive from the second device an indication indicating the first device transmits a random access request to the second device, wherein the first device is caused to receive the indication by: receiving a dedicated message on the downlink control channel, the dedicated message comprising the indication, wherein the first device is caused to receive the command by: receiving the command subsequent to the dedicated message, wherein the first device is further caused to: stop the random access procedure; and upon expiration of the time period, initiate a further random access procedure.

8. The first device of claim 1:
wherein the first device is further caused to, in response to the random access procedure being triggered by a second trigger condition, perform the command,
wherein the second trigger condition comprises the second device initiating the random access procedure; and the first device is further caused to receive from the second device an indication indicating the first device transmits a random access request to the second device,
the random access procedure comprises a contention-based random access; and the first device is caused to receive the indication by receiving a handover command comprising the indication,
wherein the first device is caused to receive the command by: receiving the command subsequent to a scheduled transmission to the second device, the command comprising a Cell Radio Network Temporary Identifier of the first device,
wherein the first device is caused to receive the command by: receiving the command indicating a successful contention resolution for the first device.

9. The first device of claim 1:
wherein the first device is further caused to, in response to the random access procedure being triggered by a second trigger condition, perform the command,
wherein the second trigger condition comprises the second device initiating the random access procedure; and the first device is further caused to receive from the second device an indication indicating the first device transmits a random access request to the second device,
the random access procedure comprises a contention-based random access; and the first device is caused to receive the indication by receiving a handover command comprising the indication,
wherein the first device is caused to receive the command by: receiving the command subsequent to a scheduled transmission to the second device, the command comprising a Cell Radio Network Temporary Identifier of the first device,
wherein the first device is further caused to: upon expiration of the time period, monitor the downlink control channel.

10. A second device, comprising:
at least one processor; and
at least one non-transitory memory including computer program code;
the at least one memory and the computer program code configured to, with the at least one processor, cause the second device to:
transmit to a first device a command indicating the first device to skip monitoring a downlink control channel between the second device and the first device for a time period;

transmit a message to the first device within a time window related to a random access procedure, wherein based on an overlap between the time period and the time window, the transmitted message is received by the first device by ignoring the transmitted command to skip monitoring the downlink control channel; or wherein based on no overlap between the time period and the time window, the transmitted command to skip monitoring the downlink control channel is performed by the first device monitoring the downlink control channel.

11. The second device of claim 10, wherein the command one of:
is ignored in response to a determination that the time period entirely overlaps with the time window, ignoring the command;
is ignored in response to a determination that the time period partially overlaps with the time window and a start of the time period is earlier than a start of the time window, performing the command until the start of the time window;
is performed in response to a determination that the time period partially overlaps with the time window and the start of the time window is identical to or earlier than the start of the time period, performing the command until an end of the time window;
is performed in response to a determination that the time period partially overlaps with the time window and the time window is within the time period, performing the command until the start of the time window and performing the command after the end of the time window; or
is performed in response to a determination that the time period fails to overlap with the time window, performing the command.

12. The second device of claim 10, wherein the time window is associated with one of a random access response and a contention resolution for the random access procedure, wherein the random access procedure is an ongoing random access procedure, and the time window corresponds to a whole random access procedure time of the ongoing random access procedure, wherein the second trigger condition comprises initiating the random access procedure as a contention-free random access.

13. The second device of claim 10, wherein the first trigger condition comprises initiating the random access procedure as a contention-based random access.

14. The second device of claim 10, wherein in response to trigger by a second trigger condition the random access procedure, comprising the command is performed, wherein the second trigger condition comprises the first device initiating the contention-free random access procedure for beam failure recovery, wherein the second device is caused to transmit the command by: transmitting the command in a search space associated with the beam failure recovery, the command comprising a cell radio network temporary identifier of the first device and indicating a successful contention resolution for the first device.

15. The second device of claim 10, wherein:
in response to the random access procedure being triggered by a second trigger condition, the command is performed,
the second trigger condition comprises the second device initiating the random access procedure; and transmit to the first device an indication indicating the first device transmits a random access request to the second device;

transmit the indication by: transmitting a dedicated message on the downlink control channel, the dedicated message comprising the indication;

transmit the command by: transmitting the command and the dedicated message simultaneously;

upon expiration of the time period, receive the random access request from the first device; and transmit the command by: transmitting the command subsequent to the dedicated message.

16. The second device of claim 10, wherein:

in response to the random access procedure being triggered by a second trigger condition, the command is performed;

the second trigger condition comprises the second device initiating the random access procedure; and transmit to the first device an indication indicating the first device transmits a random access request to the second device, the random access procedure comprises a contention-based random access;

transmit the command by: in response to reception of a scheduled transmission from the first device, transmitting the command comprising a Cell Radio Network Temporary Identifier of the first device; and transmit the command by: transmitting the command indicating a successful contention resolution for the first device.

17. A method, comprising:

receiving from a second device a command indicating the apparatus to skip monitoring a downlink control channel between the second device and the apparatus for a time period; and in response to a random access procedure being triggered by a first trigger condition, determining whether the time period overlaps with a time window associated with one of:

reception of a random access procedure or reception of a contention resolution, and based on a determined overlap, ignore the received command to skip monitoring the downlink control channel; or based on no determined overlap, the received command is performed to skip monitoring the downlink control channel.

18. A non-transitory computer readable medium comprising a computer program for causing an apparatus to perform at least the method of claim 17.

19. A method, comprising:

transmitting to a first device a command indicating the first device to skip monitoring a downlink control channel between the apparatus and the first device for a time period;

transmit a message to the first device within a time window related to a random access procedure, wherein based on an overlap between the time period and the time window, the transmitted message is received by the first device by ignoring the transmitted command to skip monitoring the downlink control channel; or wherein based on no overlap between the time period and the time window, the transmitted command to skip monitoring the downlink control channel is performed by the first device.

20. A non-transitory computer readable medium comprising a computer program for causing an apparatus to perform at least the method of claim 19.

\* \* \* \* \*